United States Patent
Strom et al.

(10) Patent No.: US 9,702,743 B2
(45) Date of Patent: *Jul. 11, 2017

(54) FLOWMETER FOR MEASURING FLOW OF A PROCESS FLUID THROUGH A CONDUIT INCLUDING UPSTREAM AND DOWNSTREAM PROCESS VARIABLE SENSORS MOUNTED ON THE PITOT TUBE

(71) Applicant: Rosemount Inc., Shakopee, MN (US)

(72) Inventors: Gregory Robert Strom, Boulder, CO (US); Robert Carl Hedtke, Young America, MN (US); David Eugene Wiklund, Eden Prairie, MN (US)

(73) Assignee: Rosemount Inc., Chanhassen, MN (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/823,102

(22) Filed: Aug. 11, 2015

(65) Prior Publication Data

US 2015/0346006 A1 Dec. 3, 2015

Related U.S. Application Data

(62) Division of application No. 13/834,613, filed on Mar. 15, 2013, now Pat. No. 9,157,775.

(51) Int. Cl.
*G01F 1/46* (2006.01)
*G01F 1/32* (2006.01)
*G01F 1/50* (2006.01)

(52) U.S. Cl.
CPC .............. *G01F 1/46* (2013.01); *G01F 1/3218* (2013.01); *G01F 1/3254* (2013.01); *G01F 1/50* (2013.01)

(58) Field of Classification Search
None
See application file for complete search history.

(56) References Cited

U.S. PATENT DOCUMENTS

| | | |
|---|---|---|
| 3,775,673 A | 11/1973 | Watanabe |
| 4,523,477 A | 6/1985 | Miller |

(Continued)

FOREIGN PATENT DOCUMENTS

| | | |
|---|---|---|
| JP | 4-505056 | 9/1992 |
| JP | 2002-538420 | 11/2002 |

(Continued)

OTHER PUBLICATIONS

International Search Report and Written Opinion of the International Searching Authority transmitted on Jul. 4, 2014 for corresponding PCT Application No. PCT/US2014/014567 filed on Feb. 4, 2014, 17 pages.

(Continued)

*Primary Examiner* — Harshad R Patel
(74) *Attorney, Agent, or Firm* — Westman, Champlin & Koehler, P.A.

(57) ABSTRACT

A process variable transmitter is configured as a flowmeter for measuring flow of a process fluid through a conduit. The transmitter includes a pitot tube extending into the conduit which creates a differential pressure in the process fluid due to flow of the process fluid. An upstream process variable sensor is mounted on the pitot tube and coupled to the flow of process fluid to sense an upstream process variable of the process fluid. A downstream process variable sensor is mounted on the pitot tube downstream of the upstream process variable sensor and coupled to the flow of process fluid to sense a downstream process variable of the process fluid. Measurement circuitry determines the flow of the process fluid based upon the upstream process variable and the downstream process variable.

31 Claims, 6 Drawing Sheets

(56) References Cited

U.S. PATENT DOCUMENTS

| | | | |
|---|---|---|---|
| 4,545,260 A | | 10/1985 | Benton et al. |
| 4,561,311 A | | 12/1985 | Keyes et al. |
| 5,036,711 A | * | 8/1991 | Good .................. G01L 19/0015 73/861.66 |
| 5,060,522 A | | 10/1991 | Lew |
| 5,365,795 A | | 11/1994 | Brower, Jr. |
| 5,817,950 A | | 10/1998 | Wiklund et al. |
| 6,089,097 A | | 7/2000 | Frick et al. |
| 6,220,103 B1 | | 4/2001 | Miller et al. |
| 6,321,166 B1 | | 11/2001 | Evans et al. |
| 6,450,043 B1 | | 9/2002 | Kolkebeck et al. |
| 6,470,755 B1 | | 10/2002 | Beachey et al. |
| 6,901,803 B2 | | 6/2005 | Fandrey |
| 7,201,067 B2 | | 4/2007 | Kurtz et al. |
| 7,258,024 B2 | | 8/2007 | Dimarco et al. |
| 7,308,832 B1 | | 12/2007 | Ifft |
| 7,798,018 B2 | | 9/2010 | Rombach et al. |
| 8,056,409 B2 | | 11/2011 | Steven |
| 8,136,414 B2 | | 3/2012 | Steven |
| 8,448,515 B2 | | 5/2013 | Orleskie |
| 8,578,783 B2 | | 11/2013 | Hedtke et al. |
| 8,601,883 B2 | | 12/2013 | Strom |
| 9,157,775 B2 | * | 10/2015 | Strom .................. G01F 1/3218 |
| 2005/0034535 A1 | | 2/2005 | Sprague |
| 2006/0060001 A1 | | 3/2006 | Kurtz et al. |
| 2010/0043567 A1 | | 2/2010 | Rombach et al. |
| 2011/0107847 A1 | | 5/2011 | Strom |
| 2011/0146405 A1 | | 6/2011 | Orleskie |

FOREIGN PATENT DOCUMENTS

| | | |
|---|---|---|
| JP | 2007-530951 | 11/2007 |
| KR | 10-1057386 | 8/2011 |
| WO | 8500883 A1 | 2/1985 |
| WO | WO 00/50851 | 8/2000 |
| WO | 0111327 A1 | 2/2001 |

OTHER PUBLICATIONS

Communication dated Nov. 20, 2015 for corresponding European Patent Application No. 14706175.8 filed on Jul. 13, 2015, 2 pages.

Invitation to Pay Additional Fees from International Application No. PCT/US2014/014567, dated Jun. 5, 2014.

Office Action from U.S. Appl. No. 13/834,613 (U.S. Pat. No. 9,157,775) dated Oct. 1, 2014.

Final Office Action from U.S. Appl. No. 13/834,613 (U.S. Pat. No. 9,157,775) dated Mar. 31, 2015.

Office Action from Australian Patent Application No. 2014238394, dated Apr. 20, 2016.

Office Action from Canadian Patent Application No. 2,897,850, dated May 26, 2016.

Office Action from Russian Patent Application No. 2015133466, dated Apr. 27, 2016.

Office Action from Chinese Patent Application No. 201310287658.0, dated Aug. 31, 2016.

Office Action from Japanese Patent Application No. 2016*500201, dated Dec. 2, 2016.

* cited by examiner

FLOWMETER FOR MEASURING FLOW OF A PROCESS FLUID THROUGH A CONDUIT INCLUDING UPSTREAM AND DOWNSTREAM PROCESS VARIABLE SENSORS MOUNTED ON THE PITOT TUBE

CROSS-REFERENCE TO RELATED APPLICATION

The present application is a Divisional of and claims priority of U.S. patent application Ser. No. 13/834,613, filed Mar. 15, 2013, the content of which is hereby incorporated by reference in its entirety.

BACKGROUND

The present invention relates to measurement of flow of a process fluid in an industrial process. More specifically, the present invention relates to a flow transmitter.

Flow rate measurement derived from differential pressure measurements is common in the art and is found in many types of fluid flow meters. Pitot tubes, for instance, sense the upstream (or "stagnation") pressure of a flowing fluid and a downstream (including "static" or "suction") pressure to produce a differential pressure value that is related to the rate of flow of the fluid that is impacting the pitot tube. An averaging pitot tube includes pressure ports leading to fluid plenums in the pitot tube body. Impulse lines then transmit the fluid pressures to a flow calculating device, such as an industrial process variable transmitter.

The process variable transmitter includes at least one sensor which receives the differential pressure. For example, a differential pressure sensor can be used which receives upstream and downstream pressures from a pitot tube type bluff body and responsively provides an electrical output related to a pressure difference between the two pressures. Circuitry within the transmitter is configured to responsively calculate flow based upon the sensed differential pressures.

The functionality of the existing flow meter consisting of an averaging pitot tube and differential pressure sensor is proven and valued in many applications. However increased functionality is possible with the measurement of multiple pressures. Further, additional measurements would enable diagnostics such as clogging of plenums, pipe blockage, installation problems, sensor failures, etc.

SUMMARY

A process variable transmitter is configured as a flowmeter for measuring flow of a process fluid through a conduit. The transmitter includes a pitot tube extending into the conduit which creates a differential pressure in the process fluid due to flow of the process fluid. An upstream process variable sensor is mounted on the pitot tube and coupled to the flow of process fluid to sense an upstream process variable of the process fluid. A downstream process variable sensor is mounted on the pitot tube downstream of the upstream process variable sensor and coupled to the flow of process fluid to sense a downstream process variable of the process fluid. Measurement circuitry determines the flow of the process fluid and/or performs diagnostics based upon the upstream process variable and the downstream process variable. In another configuration, process variable sensors are placed laterally on either side of the pitot tube and used to determine flow and/or perform diagnostics.

DETAILED DESCRIPTION OF ILLUSTRATIVE EMBODIMENTS

As discussed in the background section, pitot tube type flow sensors typically operate by generating a differential pressure. A differential pressure sensor can be used to sense this differential pressure which is then correlated to flow rate of a process fluid passing the pitot tube. Typically, the pressures are transferred to the differential pressure sensor through plenums in the pitot tube. It is known that more accurate flow measurements may be obtained if the upstream and downstream pressures obtained from the pitot tube are average pressures taken across the diameter of the flow tube. Although this does provide more accurate flow measurements, information related to pressures at specific locations within the flow tube is lost. Such additional information may be useful in providing additional functionality to the flow measuring device. For example, flow profile abnormalities may be detected, clogging, information related to consistency of the process fluid, degrading or corrosion of components within the flow tube, failure or degradation of the differential pressure sensor, etc. The present invention provides a flowmeter which measures flow of process fluid through a conduit using a pitot tube or other bluff body extending into the conduit. At least one sensor is placed on the upstream and/or downstream side of the pitot tube/bluff body to provide information to the flowmeter. This information can be used to determine flow rate and/or provide additional functionality to the flowmeter. Operation of example embodiments of the invention are discussed below. Providing redundant flow measurement enhances measurement confidence, improves reliability, and facilitates preventative maintenance. Further, pressure sensors carried on the pitot tube can be used to replace the differential pressure sensor of prior art configurations.

Figure 1:
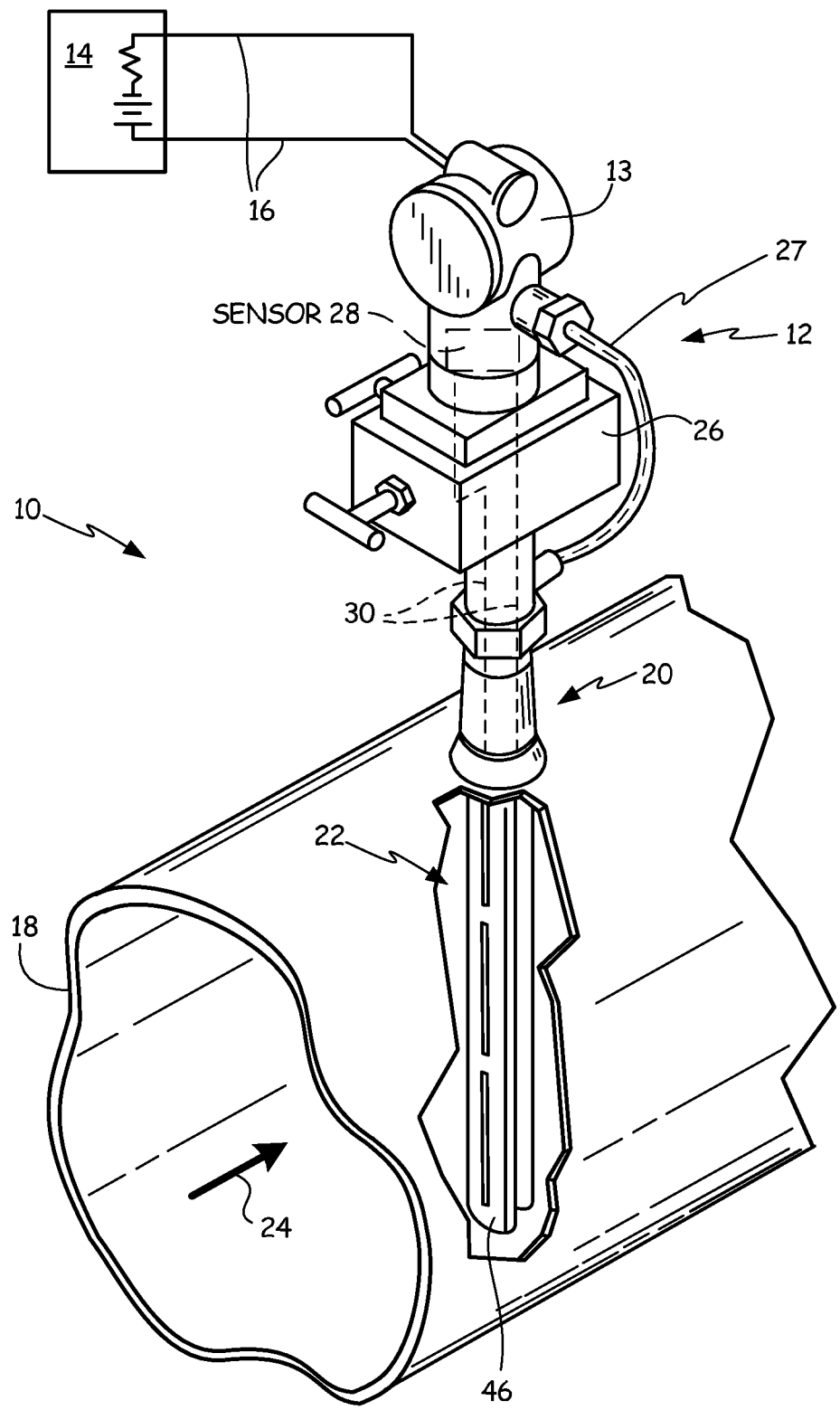
FIG. 1 shows a flow measurement system of the present invention and a cut away view of process piping.

FIG. 1 is a diagrammatic view of process control system 10 illustrating one example of an environment of embodiments of the invention. Flow measurement system 12 is coupled to control room 14 (modeled as a voltage source and resistance) through process control loop 16. Loop 16 can utilize an appropriate protocol to communicate flow information between flow transmitter 12 and control room 14. For example, process control loop 16 operates in accordance with a process industry standard protocol such as Highway Addressable Remote Transducer (HART®), FOUNDATION™ Fieldbus or any other appropriate protocol. Further, the process control loop 16 can comprise a wireless process control loop in which information is communicated wirelessly, for example, using the WirelessHART® communication protocol in accordance with the IEC 62591 Standard. Other techniques including Ethernet or fiberoptic connections, can be employed, as well as other communication techniques.

In one configuration, differential pressure is used to determine flow of process fluid based upon a difference between a pressure sensed on the "upstream" side of a pitot tube style probe inserted into the flow of process fluid and the "downstream" side of the probe. In another example configuration, pressures are sensed laterally on either side of the probe and generally perpendicular to the direction of the flow. These lateral pressures vary as a function of vortex shedding. The frequency and/or amplitude of this variation, as discussed below, can be used to determine the flow rate of the process fluid.

FIG. 1 shows further a cut away portion of a process fluid container such as a pipe, or closed conduit, 18 into which is installed a differential pressure measuring probe 20. Probe 20 provides a pitot tube type bluff body 22 which diametrically spans the inside of pipe 18. The directional arrow 24 in FIG. 1 indicates the direction of fluid flow in pipe 18. A fluid manifold 26 and flow transmitter housing 13 are shown mounted on the exterior end of pitot tube 20. Transmitter housing 13 may include an optional pressure sensor 28 that is fluidically coupled to probe 20 through passageways. Additionally, FIG. 1 illustrates a secondary sensor connection 27 which is used to connect process variable sensors carried by the bluff body 22 to circuitry within flow transmitter 13. Operation of the process variable sensors is explained below in greater detail.

Figure 2:
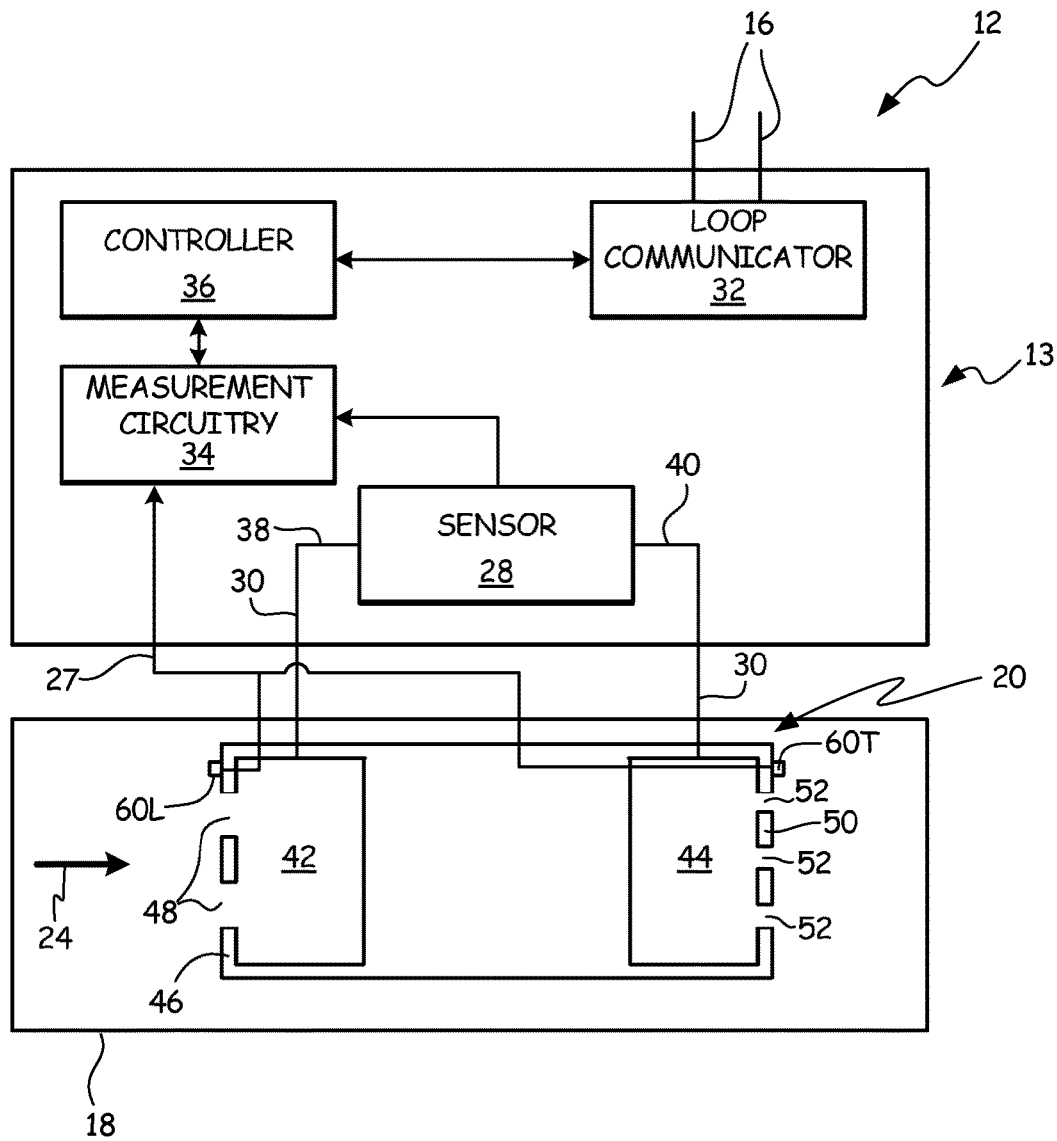
FIG. 2 is a simplified block diagram of a flow measurement system and flow transmitter in accordance with one example embodiment of the present invention.

FIG. 2 is a system block diagram of flow transmitter 12. Flow measurement transmitter 12 includes flow transmitter housing 13 and differential pressure measurement probe 20. Flow measurement transmitter 12 is coupleable to a process control loop such as loop 16 and is adapted to communicate a process variable output related to the flow of process fluid flow within pipe 18. Transmitter 12 includes a loop communicator 32, optional differential pressure sensor 28, measurement circuitry 34, and controller 36.

Loop communicator 32 is coupleable to a process control loop, such as loop 16, and is adapted to communicate upon the process control loop. Such communication can be in accordance with any appropriate process industry standard protocol such as the protocols discussed above.

If optional pressure sensor 28 is used, first and second ports 38, 40 are coupled to optional first and second plenums 42, 44 respectively of probe 20 through passageways 30. Sensor 28 can be any device that has an electrical characteristic that changes in response to changes in applied pressure. For example, sensor 28 can be a capacitive pressure sensor in which the capacitance changes in response to the differential pressure applied between ports 38 and 40.

Measurement circuitry 34 is coupled to sensor 28 and is configured to provide a sensor output related to differential pressure between ports 38 and 40. Measurement circuitry 34 can be any electronic circuitry that can provide a suitable signal related to differential pressure. For example, measurement circuitry can be an analog-to-digital converter, a capacitance-to-digital converter or any other appropriate circuitry.

Controller 36 is coupled to measurement circuitry 34 and loop communicator 32. Controller 36 is adapted to provide a process variable output to loop communicator 32 which output is related to the sensor output provided by measurement circuitry 34. Controller 36 can be a microprocessor, or any other appropriate device. Typically, controller 36 will convert the differential pressure into an output that is related to flow rate of the process fluid. The controller may perform compensation, for example, using curve fitting techniques or the like to adjust for non-linearities in the relationship between differential pressure and flow rate. Additional factors can be used to compensate the flow rate measurements including compensating for variations due to temperature, the process fluid being sensed, absolute pressure, etc.

Although loop communicator 32, measurement circuitry 34 and controller 36 have been described with respect to individual modules, it is contemplated that they can be combined such as on an Application Specific Integrated Circuit (ASIC). Similarly, various software components in a microprocessor based system can implement aspects of measurement circuitry 34, controller 36 and loop communicator 32.

Differential pressure measurement probe 20 is coupled to transmitter housing 13 by passageways 30. Thus, port 38 of sensor 28 is coupled to first plenum 42, while port 40 of sensor 28 is coupled to second plenum 44. A "plenum" is a passageway, a channel, a tube or the like into which fluid of a particular character or pressure is directed or admitted and through which the fluid pressure is conducted or conveyed.

In the illustrated embodiment, first (upstream) plenum 42 includes at least one impact aperture 48 and is disposed to communicate pressure from the probes impact (or upstream) surface 46 to port 38 of sensor 28. Aperture 48 may be any appropriate configuration, aperture 48 includes a longitudinal component that, in some embodiments, can be long enough that aperture 48 will be substantially aligned with the longitudinal axis of bluff body 22. Second (downstream) plenum 44 includes a non-impact (or downstream) surface 50 spaced downstream from impact surface 46. Non-impact surface 50 includes at least one non-impact aperture 52 disposed to communicate pressure from the non-impact surface via plenum 44 to port 40 of sensor 28. If a second plenum is not used, a pressure tap can be provided. The locations of the pressures being measured are for descriptive purposes and the invention is not limited to this configuration.

In one aspect, the present invention provides at least one process variable sensor 60 which is carried on the probe 20 of a flowmeter. The process variable sensor 60 can be utilized by the transmitter 12 to provide additional functionality. For example, additional pressure measurements may be obtained, temperature measurements, etc. If multiple sensors are provided, additional information across various locations of the probe 20 may be obtained. In FIG. 2, process variable sensors 60L and 60T are shown and are illustrated as coupling to measurement circuitry 34. Sensor 60L is positioned on the leading edge and sensors 60T are positioned on the trailing edge of tube 20. The particular technology employed by the process variable sensors 60 may be in accordance with any appropriate technique. Further, any number of process variable sensors 60 may be used. These additional process variable sensors can be used, for example, to provide a redundant technique for measuring flow, for use in performing diagnostics. For example, the diagnostics include identifying a clogged plenum opening or plugged flow tube, identifying the formation of deposits on process variable components, monitoring for noise through the process fluid, etc. A number of example configurations are discussed below. Further, the present invention is not limited to embodiments which require a plenum and/or separate pressure sensor. In some embodiments, sensors are only positioned on the probe itself. For example, two absolute pressure sensors can be used and the difference thereby can be calculated to determine differential pressure.

As discussed above, flow rate from a probe 20 is determined from the differential pressure signal between high and low sides of the bluff body primary element.

In addition to creating a differential pressure, a bluff body in a flow stream sheds vortices with a frequency which is proportional to the fluid velocity. The equation for the frequency of vortex shedding is as follows:

$$f = \frac{SV}{d_p} \quad \text{Equation 1}$$

Figure 3:
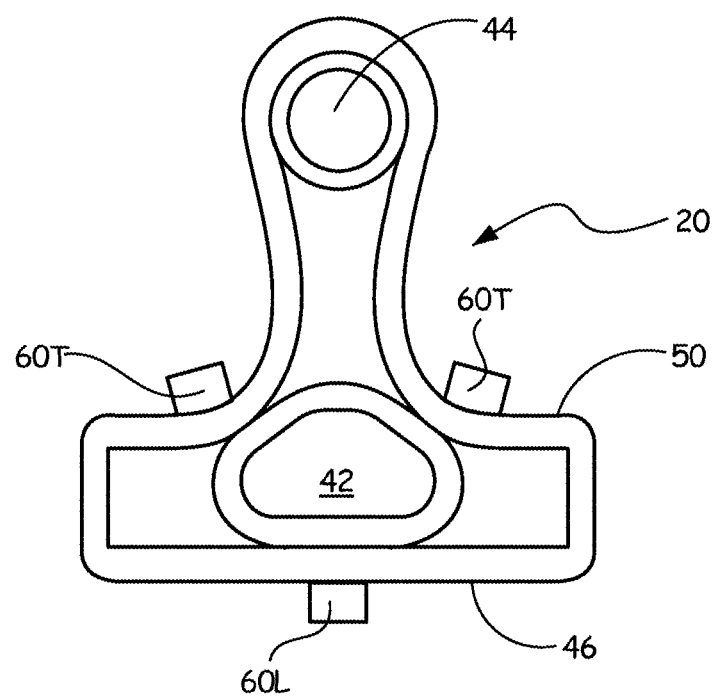
FIG. 3 is a cross-sectional view of a probe in a flowmeter in accordance with the present invention including a process variable sensor.

Where:
S=Strouhal number
V=fluid velocity
$d_p$=probe width
f=vortex shedding frequency The probe 20 of a pitot tube-type flowmeter functions as a body which is placed in the flow of process fluid and therefore sheds vortices which are proportional to flow rate of the process fluid. The sensors 60 which are coupled to the probe can be used to measure differential pressure and can also be used to sense induced pressure during vortex separation and thereby determine the shedding frequency. FIG. 3 is a top cross-section view of probe 20 configured in a "T" configuration such as that provided by the ANNUBAR® averaging pitot tube available from Rosemount Inc. of Chanhassen, Minn.

The flow rate obtained from the measured vortex shedding frequency can be compared to the flow rate determined from the differential signal between high and low sides of the primary element. Differences in the resulting flow measurements can be used to trigger an alert for sensor service. If either mode of flow measurement is found to be unreliable, the other can be utilized. Multiple sensors can also be used to optimize performance, expand redundancy, and enhance turndown.

Sensors 60 located in the positions indicated in FIG. 3 can be used to measure the fluctuating pressure and will also sense the fluctuating component of the drag force. This drag force fluctuation occurs at twice the vortex shedding frequency. Similarly, the fluctuating component of a lift force can be obtained by subtracting one of the two sensors on the rear of the shedder (in the wake) from the other. This will be at the vortex shedding frequency. Typically, the fluctuating lift component is larger in magnitude than the fluctuating drag component.

The density of the flowing medium could be determined by comparing the velocity calculated from the vortex shedding equation to the velocity calculated from the primary element equation.

$$Q_a = F_{na} \cdot K \cdot D^2 \cdot Y \cdot F_{aa} \cdot \sqrt{\frac{1}{\rho_f}} \sqrt{h_w} \quad \text{Equation 2}$$

Where:
$Q_a$=volume rate of flow for a gas
$F_{na}$=units conversion factor
K=primary element flow coefficient
D=pipe internal diameter
Y=primary element gas expansion factor (Y=1 for incompressible fluids such as liquids)
$F_{aa}$=thermal expansion factor
$\rho f$=flowing density
$h_w$=differential pressure The volume rate of flow of a fluid is equal to the fluid velocity times the area of the inside of the pipe. Therefore, the assumed density value in the averaging pitot equation can be confirmed or corrected for by using fluid velocity (V) calculated via the vortex equation as follows:

$$Q_a = V \cdot A \quad \text{Equation 3}$$

OR $$V = \frac{Q_a}{A} \quad \text{Equation 4}$$

where A is the pipe area.

Substituting the right hand side of the primary element Equation 2 in Equation 4 gives us:

$$V = \frac{F_{na} \cdot K \cdot D^2 \cdot Y \cdot F_{aa} \cdot \sqrt{\frac{1}{\rho_f}} \sqrt{h_w}}{A} \quad \text{Equation 5}$$

This can be in terms of diameter:

$$V = \frac{F_{na} \cdot K \cdot D^2 \cdot Y \cdot F_{aa} \cdot \sqrt{\frac{1}{\rho_f}} \sqrt{h_w}}{\frac{\pi}{4} \cdot D^2} \quad \text{Equation 6}$$

Invoke Equation 1 but rewrite it as Equation 7:

$$V = \frac{f d_p}{S} \quad \text{Equation 7}$$

Setting for the right side of Equation 6 equal to the right side of Equation 7 gives Equation 8:

$$\frac{f \cdot d_p}{S} = \frac{F_{na} \cdot K \cdot D^2 \cdot Y \cdot F_{aa} \cdot \sqrt{h_w}}{\frac{\pi}{4} \cdot D^2 \cdot \sqrt{\rho_f}} \quad \text{Equation 8}$$

Simplifying and rewriting as Equations 9 and 10:

$$\sqrt{\rho_f} = \frac{F_{na} \cdot K \cdot Y \cdot F_{aa} \cdot S \cdot \sqrt{h_w}}{\frac{\pi}{4} \cdot f \cdot d_p} \quad \text{Equation 9}$$

$$\rho_f = 16 \cdot \left[\frac{F_{na} \cdot K \cdot Y \cdot F_{aa} \cdot S}{\pi \cdot f \cdot d_p}\right]^2 \cdot (h_w) \quad \text{Equation 10}$$

This relationship can be used for fluid density $\rho_f$ in Equation 2, giving the following expression for the volumetric flow rate:

$$Q_a = \left[\frac{\pi \cdot D^2 \cdot d_p}{4 \cdot S}\right] \cdot (f) \quad \text{Equation 11}$$

Where the terms in parenthesis is a measured value and the terms in brackets are constants or values that an be determined during the manufacturing process. There are multiple means of calculating the various teams with the use of sensors 60 to measure the differential pressure in the streamwise direction for use in the conventional DP flow calculations as in Equation 2 and on either side of the pitot tube to sense the vortex shedding frequency for use in Equation 7 to obtain velocity from which the volumetric flow rate can be readily calculated. These alternative methods can be used to verify the performance of the meter.

In addition to being able to calculate volumetric flow rate using the sensors of the present invention, it is also possible to calculate mass flow rate. From the measurements related to the vortex shedding, the mass flow rate can be obtained directly. Rearranging the Equation 1 above relating the vortex shedding frequency to the fluid velocity gives:

$$V = \frac{fd_p}{S} \qquad \text{Equation 12}$$

Additionally, with the present invention, it is possible to use the amplitude of the vortex shedding to determine the mass flow rate. The mass flow rate is defined as:

$$Q_m = \rho_f V \cdot A \qquad \text{Equation 13}$$

Further, the amplitude of the vortex signal is proportional to the dynamic pressure in accordance with the following relationship:

$$Amp_v = C \cdot \rho_f V^2 \qquad \text{Equation 14}$$

Where:
$Amp_v$=Amplitude of the vortex signal
$\rho_f$=flowing density of the fluid
C=Proportionally constant (assumed to be fluid independent but may require calibration)
V=Fluid velocity
Equation 14 can be rearranged to yield:

$$\rho_f \cdot V = \frac{Amp_v}{C \cdot V} \qquad \text{Equation 15}$$

Next, the expression for V the fluid velocity from Equation 12 can be substituted into Equation 15 yielding:

$$\rho_f \cdot V = \left(\frac{Amp_v \cdot S}{C \cdot f \cdot d_p}\right) \qquad \text{Equation 16}$$

The value for $\rho_f V$ can be substituted into Equation 13 yielding the mass flow rate:

$$Q_m = \left(\frac{Amp_v}{f}\right) \cdot \left[\frac{A \cdot S}{C \cdot d_p}\right] \qquad \text{Equation 17}$$

Where the terms in parenthesis are measured values and the terms in brackets are constants or values that can be determined during the manufacturing process. Further, it should be noted that some of the terms can be assumed to be constants (i.e., S and C) when, in fact, they may be functions of Reynolds number. The correction can be made using means known in the art.

Thus, unlike typical prior art vortex flow shedding sensors, which, although they have sufficient frequency bandwidth to detect the shedding frequency, do not allow for quantitative measurement of the vortex amplitude, the sensors 60 of the present invention yield sufficiently accurate amplitude and frequency information to determine mass flow.

In addition to determining process variables such as mass flow rate, the additional process variable sensors of the present invention can be used to perform diagnostics. For example, impulse tubes 30 are small internal diameter pipes that transmit a pressure signal from a pipe to a pressure sensor. In flow measurement, impulse tubes transmit the impact pressure from the upstream side of a primary element and the static pressure from the downstream side of a primary element to the differential pressure (DP) sensor 28. The square root of the value of the DP induced across the primary element is proportional to the flow rate in the pipe.

Improperly designed impulse tubes can cause problems in flow measurement systems including plugging, leakage, liquids trapped in gas flow measurements, gas trapped in liquid flow measurements, etc. The additional process variable sensors 60 can be used to measure differential pressure between the upstream and downstream sides of the pitot tube. The relationship between these measurements and the sensed differential pressure can be used to identify potential problems with the impulse tubes. This can be used to allow an operator to service or replace the tubes prior to the their ultimate failure. Similarly, the additional process variable sensors can be used to identify degradation in the tubes and thereby used to compensate differential pressure measurements. Similarly, detected plugging, clogging or other degradation of these tubes can be used to compensate the sensed differential pressure. This allows a flowmeter to continue operation, even with degraded accuracy, until the impulse tubes can be replaced, sealed or otherwise repaired. The compensation can be based upon compensation factors stored in, for example, a memory in controller 36.

In yet a further example embodiment, the additional process variable sensors 60, when configured as pressure sensors, can be used to completely eliminate the impulse tubes themselves. The elimination of impulse tubes in a differential pressure flow application also eliminates the problems commonly associated with impulse tubes. In such a configuration, pressure measurements from the downstream side of the pitot tube can be subtracted from pressure measurements on the upstream side in order to obtain the differential pressure. The subtraction can occur through analog electronic circuitry, or can be performed digitally, for example in controller 36 or measurement circuitry 34. As discussed above, the sensors 60 can also be used to measure the vortex shedding frequency.

A pitot tube with multiple process variable sensors 60 positioned on the exterior upstream and downstream surfaces can directly measure the velocity flow profile in a pipe. This information can be used by measurement circuitry 34 to correct for errors caused by variations in the flow profile as well as perform diagnostics. In applications where the process fluid swirls or has two dimensional profile distortions, two or more pitot tube type probes, each with distributed process variable sensors can be used to better detect variations in the flow profile and thereby correct for errors in flow rate measurements or identify a potential problem in the process, such as an obstruction in the pipe. The accuracy of the flow profile correction is related to the number of sensors positioned along the probe. A greater number of sensors will provide more information related to variations in the flow profile whereby more accurate flow rate measurements can be obtained.

When installing a pitot tube into an active flow stream (hot tapping) it is difficult to determine if the tip of the tube is touching the opposite wall of the pipe. This can be a serious problem as a cantilevered primary element is substantially weaker than one supported by contact with the opposite wall. A partially inserted device exposed to a flow stream for an extended period is likely to fail. Additionally, there is a large mechanical advantage of the insertion mechanism that can damage the element if over tightened. A cantilevered pitot tube will create a resonant frequency that can be detected by the sensors 60. In another embodiment, a sensor 60 placed at the tip of the probe can sense an opposite pipe wall when seating the probe. This measurement allows a supported tip and an unsupported tip to be identified. A display on the transmitter can be used to provide an indication to an operator once the tip is seated.

Figure 4:
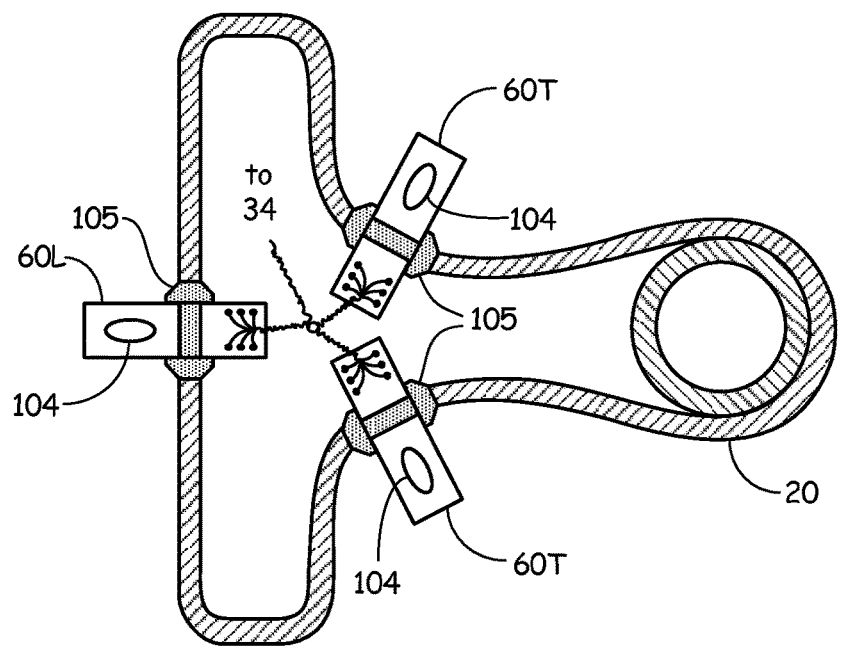
FIG. 4 is a partial view of a pitot tube carrying process variable sensors in accordance with one example embodiment.

FIG. 4 is a partial view of pitot tube 20 including a process variable sensors 60 carried thereon. In FIG. 4, process variable sensors 60 are arranged as pressure sensors. In this configuration, sensors 60 can be constructed of a brittle, substantially incompressible material having characteristics which are suitable for long term exposure to a process fluid. For example, sensors 60 can be constructed of two sapphire pieces which are connected together using, for example, fusion bonding. A cavity 104 is formed between the two sapphire pieces and carries, for example, capacitive plates (not shown) therein. As pressure from the process fluid is applied to the sensor 60, the cavity 104 slightly deforms. This deformation can be sensed based upon changes in the capacitance between the two capacitive plates. Electrical connections are shown in FIG. 4 which extend from the capacitive plates to measurement circuitry 34 shown in FIG. 2. In such a configuration, sensor 60 can operate, for example, in accordance with the pressure sensors shown and discussed in U.S. Pat. No. 6,089,097, issued Jul. 18, 2000, entitled ELONGATED PRESSURE SENSOR FOR A PRESSURE TRANSMITTER, by Roger L. Frick et al., assigned to Rosemount Inc.

In the configuration illustrated in FIG. 4, the sensors 60 are directly exposed to process fluid. To provide sufficient room for placing the sensors 60, the sensors 60 can be offset vertically (perpendicular to the page) along the length of the pitot tube 20. Sensors 60 can be mounted through holes in tube 20 and secured in place using a braise 105 or the like. The two sensors 60T positioned downstream on the pitot tube 20 are placed on either side of the pitot tube whereby vortex shedding can be detected. The upstream sensor 60L is positioned in the middle of the pitot tube 20 for more accurate sensing.

Figure 5:
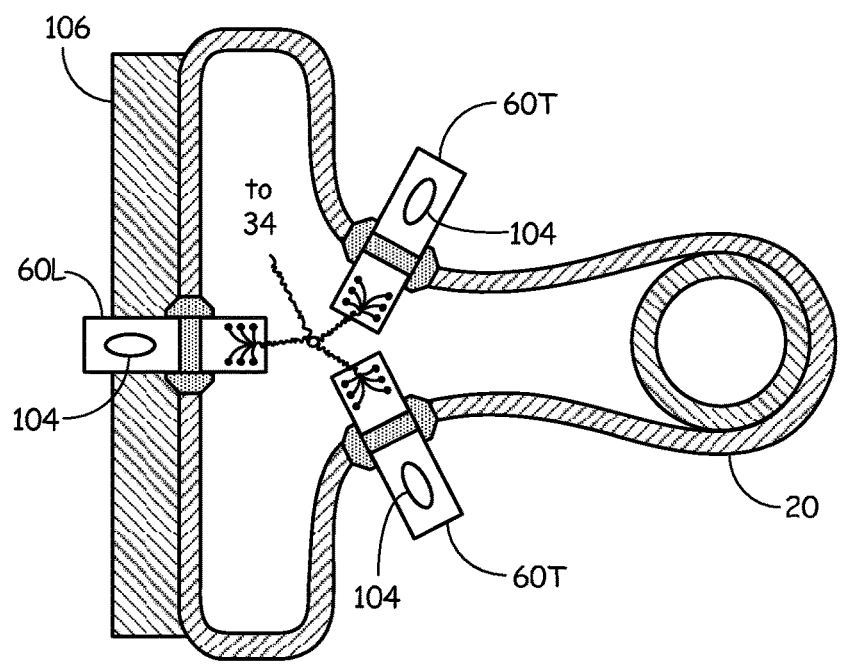
FIG. 5 is a partial view of a pitot tube carrying process variable sensors in another example configuration.
Figure 6:
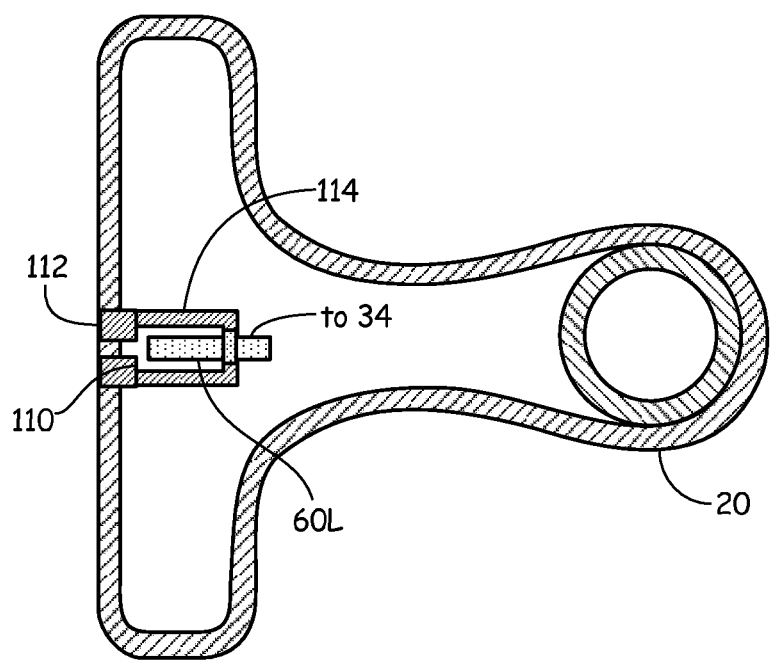
FIG. 6 is a partial view of a pitot tube having a process variable sensor carried in a cavity and isolated from process fluid using an isolation diaphragm.

FIG. 5 shows a configuration similar to FIG. 4 in which a protection piece 106 is placed around the upstream sensor 60L. Piece 106 can be a barrel, perforated barrel or other configuration and serves to protect the upstream sensor 60L from the flow of process fluid without inhibiting pressure detection. FIG. 6 shows another example embodiment in which sensor 60L is carried in an oil filled cavity 110 formed of a tubular structure 114. In FIG. 6, the cavity 110 formed by tubular structure 114 is isolated from the process fluid using an isolation diaphragm 112. The cavity 110 is filled with a substantially incompressible fluid whereby pressure applied against the isolation diaphragm 112 is transferred through the isolation fluid to the sensor 60L. The sensor 60L can be secured within tube 114 using a braising technique or the like. The diaphragm 112, tube 114 and sensor 60L can be assembled separately and then mounted in pitot tube 20 as desired. For example, the assembly can be welded to the pitot tube 20. Additional assemblies can be carried by the pitot tube 20 which are not shown in FIG. 6. This configuration allows the sensors 60 to be isolated from the process fluid and thereby protected from damage. In another configuration, sensors 60 are carried within plenums 42 or 44. This configuration also provides protection to sensors 60 from impact of any particles carried in the process fluid. Although a specific type of pressure sensor configuration is discussed herein, any appropriate pressure sensing technology may be implemented.

Figure 7:
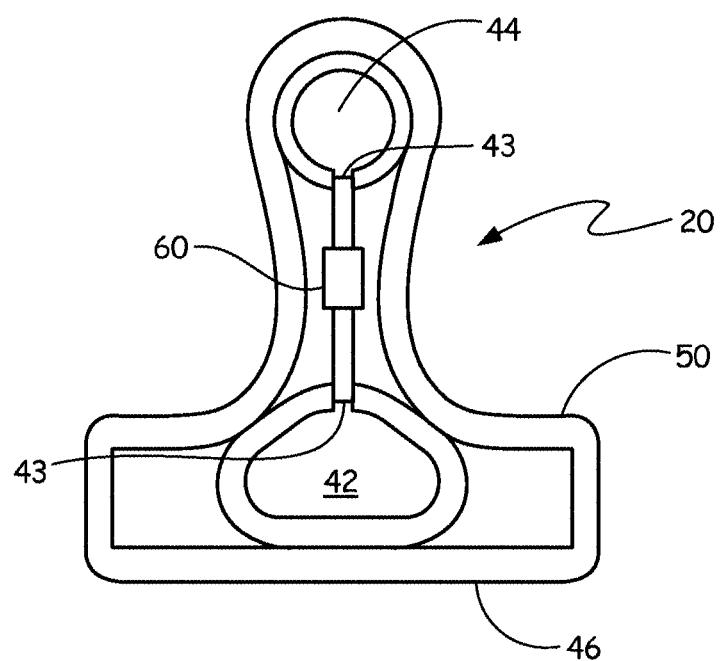
FIG. 7 is a partial view of a pitot tube carrying process variable sensors in accordance with one example embodiment.

In yet another example configuration shown in FIG. 7, a differential pressure sensor 60 is positioned between plenums 42 and 44 whereby the impulse tubes 30 can be eliminated. In some configurations, a process variable sensor which directly measures differential pressure provides a more accurate differential pressure determination than using two absolute pressure sensors to determine differential pressure by subtracting a difference between measurements between the two sensors. In such a configuration, a differential pressure sensor 60 can be exposed directly to process fluid in plenums 42 and 44. In another example configuration, isolation diaphragms 43 are placed in the walls of plenums 42 and 44 whereby the differential pressure sensor 60 is isolated from the process fluid. An isolation fluid can be used to transmit the pressure in a plenum 42, 44 from the diaphragm to the differential pressure sensor.

Although the present invention has been described with reference to preferred embodiments, workers skilled in the art will recognize that changes may be made in form and detail without departing from the spirit and scope of the invention. The present invention includes the placement of one or more sensors along the length of a probe inserted into the flow a process fluid. The probe can be configured as a pitot tube in which pressure from the flow of process fluid is transferred to an external pressure sensor. In such a configuration, the process variable sensors carried on the probe can be used for diagnostics purposes, to improve accuracy and sensor measurements, for calibration purpose, to determine flow profiles, etc. However, the invention is not limited to this configuration. The invention also includes a configuration in which no external sensors are used and all of the sensors are carried on the probe itself. In such a configuration, the internal plenums which are used in a typical pitot tube may not be necessary. As used herein, the term "pitot tube" refers generally to the probe inserted into the fluid flow. The "pitot tube" does not require internal passageways to conduct pressures from within the flow of process fluid to an external pressure sensor. In some configurations, the process variable sensor 60 comprises a pressure sensor which includes a temperature sensor.

What is claimed is:

1. A flowmeter for measuring flow of a process fluid through a conduit, comprising:
   a pitot tube extending into the conduit which creates a differential pressure in the process fluid due to flow of the process fluid;
   an upstream process variable sensor mounted on the pitot tube and exposed to a pressure generated by the flow of process fluid configured to sense an upstream process variable of the process fluid and responsively provide a first output;
   a downstream process variable sensor mounted downstream of the upstream process variable sensor mounted on the pitot tube and exposed to a pressure generated by the flow of process fluid configured to sense a downstream process variable of the process fluid and responsively provide a second output; and a measurement circuitry configured to determine the flow of the process fluid based upon the first output from the upstream process variable sensor and the second output from the downstream process variable sensor;

wherein the upstream and downstream process variable sensors comprise a brittle material having a cavity formed therein which deforms in response to applied pressure.

2. The flowmeter of claim 1 wherein the upstream and downstream process variable sensors comprise pressure sensors.

3. The flowmeter of claim 1 including a differential pressure sensor configured to sense a differential pressure created by the pitot tube.

4. The flowmeter of claim 3 wherein the measurement circuitry provides an output based upon a difference between the measured differential pressure and a difference between the first and second process variable.

5. The flowmeter of claim 1 wherein at least one of the upstream and downstream process variable sensors includes a temperature sensor.

6. The flowmeter of claim 1 wherein the measurement circuitry provides a diagnostic output based upon the upstream process variable and the downstream process variable.

7. The flowmeter of claim 6 wherein the diagnostic output is related to degradation of the pitot tube.

8. The flowmeter of claim 6 wherein the diagnostic output comprises an indication of clogging of an impulse tube which couples the pitot tube to a pressure sensor.

9. The flowmeter of claim 1 wherein the measurement circuitry determines a flow profile of process fluid based upon the upstream and downstream process variables.

10. The flowmeter of claim 1 wherein the measurement circuitry detects contact between the pitot tube and the conduit based upon an output from at least one of the upstream and downstream process variables.

11. The flowmeter of claim 1 wherein the measurement circuitry calculates the density of the process fluid based upon at least one of the upstream and downstream process variables.

12. The flowmeter of claim 1 wherein the measurement circuitry calculates mass flow based upon at least one of the upstream and downstream process variables.

13. The flowmeter of claim 12 wherein the mass flow is calculated based upon an amplitude of a process variable.

14. The flowmeter of claim 1 wherein at least one of the upstream and downstream process variable sensors is mounted on an outside surface of the flow tube.

15. The flowmeter of claim 1 including a second downstream process variable sensor.

16. The flowmeter of claim 1 wherein at least one of the upstream and downstream process variable sensors is mounted in a plenum of the flow tube.

17. A method for measuring flow of a process fluid flowing through a conduit, comprising:

placing a pitot tube in the flow of process fluid through the conduit, the pitot tube generating an upstream and a downstream pressure;

placing an upstream process variable sensor on an upstream side of the pitot tube to sense an upstream process variable and responsively provide a first output;

placing a downstream process variable sensor on a downstream side of the pitot tube to sense a downstream process variable and responsively provide a second output, wherein the upstream and downstream process variable sensors comprise a brittle material having a cavity formed therein which deforms in response to applied pressure; and determining flow of the process fluid based upon the first output from the sensed upstream pressure variable and the second output from the sensed downstream pressure variable.

18. The method of claim 17 wherein the upstream and downstream process variable sensors comprise pressure sensors.

19. The method of claim 17 including measuring a differential pressure between the upstream and downstream process variables using a differential pressure sensor.

20. The method of claim 19 including providing an output based upon a difference between the measured differential pressure and a difference between the first and second process variable.

21. The method of claim 19 including compensating the measured differential pressure is compensated based upon the upstream process variable and the downstream process variable.

22. The method of claim 17 wherein at least one of the upstream and downstream process variables sensors senses temperature.

23. The method of claim 17 including providing a diagnostic output based upon the upstream process variable and the downstream process variable.

24. The method of claim 23 wherein the diagnostic output is related to degradation of the pitot tube.

25. The method of claim 23 wherein the diagnostic output comprises an indication of clogging of an impulse tube which couples the pitot tube to a pressure sensor.

26. The method of claim 17 including determining a flow profile of process fluid based upon the upstream and downstream process variables.

27. The method of claim 17 including calculating density of the process fluid based upon at least one of the upstream and downstream process variables.

28. The method of claim 17 including calculating mass flow based upon at least one of the upstream and downstream process variables.

29. The method of claim 17 wherein at least one of the upstream and downstream process variable sensors is mounted on an outside surface of the flow tube.

30. The method of claim 17 wherein at least one of the upstream and downstream process variable sensors is mounted in a plenum of the flow tube.

31. A flowmeter for measuring flow of a process fluid through a conduit, comprising:

a pitot tube extending into the conduit which creates a differential pressure in the process fluid due to flow of the process fluid;

an upstream plenum in the pitot tube which carries an upstream pressure generated by flow of the process fluid;

a downstream plenum in the pitot tube which carries a downstream pressure generated by flow of the process fluid;

a differential pressure sensor mounted in the pitot tube and coupled between the upstream and downstream plenums configured to measure a differential pressure between the upstream and downstream pressures;

measurement circuitry configured to determine the flow of the process fluid based upon the measured differential pressure.

* * * * *